(12) United States Patent
Lee et al.

(10) Patent No.: US 9,755,467 B2
(45) Date of Patent: Sep. 5, 2017

(54) OPEN-TYPE INDUCTION MOTOR

(71) Applicant: Hyundai Heavy Industries Co., Ltd., Ulsan (KR)

(72) Inventors: Jong In Lee, Gyeonggi-do (KR); Sung Hyun Moon, Seoul (KR); Kwang Soo Lee, Ulsan (KR); Ok Jin Kim, Ulsan (KR); Rae Eun Kim, Seoul (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 370 days.

(21) Appl. No.: 14/524,347

(22) Filed: Oct. 27, 2014

(65) Prior Publication Data
US 2015/0115752 A1    Apr. 30, 2015

(30) Foreign Application Priority Data

Oct. 28, 2013  (KR) .......................... 10-2013-0128335

(51) Int. Cl.
*H02K 1/32* (2006.01)
*H02K 9/06* (2006.01)

(52) U.S. Cl.
CPC ............... *H02K 1/32* (2013.01); *H02K 9/06* (2013.01); *H02K 2205/12* (2013.01)

(58) Field of Classification Search
CPC ..................................................... H02K 1/32
USPC ..................................... 310/60 A, 59, 58, 61
See application file for complete search history.

(56) References Cited

U.S. PATENT DOCUMENTS

| 3,684,906 A | 8/1972 | Lenz |
| 4,286,183 A | 8/1981 | Montgomery |
| 4,301,386 A * | 11/1981 | Schweder ............... H02K 1/32 310/211 |

(Continued)

FOREIGN PATENT DOCUMENTS

| JP | S53116405 A | 10/1978 |
| JP | H08214474 A | 8/1996 |

(Continued)

OTHER PUBLICATIONS

Office Action from the Korean Intellectual Property Office dated Feb. 27, 2015.

(Continued)

*Primary Examiner* — Hanh Nguyen
(74) *Attorney, Agent, or Firm* — Locke Lord LLP; Christopher J. Capelli; Judy R. Naamat

(57) ABSTRACT

There is provided an open-type induction motor, and more particularly, to an open type induction motor in which a rotor has a structure allowing air to flow therein, thus enhancing cooling efficiency of the rotor and a stator. The open-type induction motor includes: a stator including an iron stator core having a radial duct hole and a stator coil wound around the iron stator core; and a rotor disposed in a hollow of the stator so as to be rotatable by magnetism generated by the stator coil, and including a rotational shaft, a plurality of iron rotor cores stacked in an axial direction of the rotational shaft and coupled to the rotational shaft, a rotor coil coupled to the plurality of iron rotor cores, and duct plates stacked between the plurality of iron rotor cores and outwardly discharging air present at the inner side of the iron rotor cores.

6 Claims, 5 Drawing Sheets

(56) References Cited

U.S. PATENT DOCUMENTS

| | | | |
|---|---|---|---|
| 4,331,895 A * | 5/1982 | Edick | B22D 19/0054 |
| | | | 310/211 |
| 4,365,178 A | 12/1982 | Lenz | |
| 5,633,543 A * | 5/1997 | Jarczynski | H02K 1/20 |
| | | | 310/59 |
| 2006/0076841 A1 * | 4/2006 | Kreitzer | H02K 5/20 |
| | | | 310/59 |
| 2009/0058205 A1 * | 3/2009 | Tounosu | H02K 1/32 |
| | | | 310/61 |
| 2009/0261669 A1 | 10/2009 | Sirois | |

FOREIGN PATENT DOCUMENTS

| | | |
|---|---|---|
| JP | H1129914 A | 10/1999 |
| JP | 2001268846 A | 9/2001 |
| JP | 2005045941 A | 2/2005 |
| JP | 2009261237 A | 11/2009 |
| JP | 2009303343 A | 12/2009 |
| JP | 2012-034503 | 2/2012 |
| KR | 20010036665 A | 5/2001 |

OTHER PUBLICATIONS

Office Action for Corresponding Japanese Application No. JP2014217280, dated Aug. 25, 2015.
Office Action for German Patent Application No. 102014115666.8, dated Apr. 5, 2017.

* cited by examiner

OPEN-TYPE INDUCTION MOTOR

CROSS-REFERENCE TO RELATED APPLICATION

This application claims the priority of Korean Patent Application No. 10-2013-0128335 filed on Oct. 28, 2013, with the Korean Intellectual Property Office, the disclosure of which is incorporated herein by reference.

BACKGROUND

The present disclosure relates to an open-type induction motor, and more particularly, to an open type induction motor in which a rotor has a structure allowing air to flow therein, thus enhancing cooling efficiency of the rotor and a stator.

An induction motor includes a shaft supporting a rotor, the rotor rotatably supported by the shaft, a stator positioned to face the rotor and generating magnetism to enable the rotor to rotate, a frame press-fitting the stator to protect and support the stator, brackets fastened to front and rear sides of the frame, an inlet formed in the front bracket to allow ambient air to be drawn therethrough, an outlet formed in the rear bracket to outwardly discharge air drawn through the inlet, and a ventilation fan installed within the rear bracket rotating to intake and discharge air to decrease an internal temperature of the frame When power is applied, the rotor supported by the shaft rotates at high speed, due to magnetism generated by the stator, driving the induction motor.

Here, since the rotor rotates, an internal temperature of the induction motor increases.

Thus, in order to cool the interior of the induction motor, a ventilation fan provided within the rear bracket of the frame is driven to allow ambient air to be drawn in through the inlet formed in the front bracket and pass between the rotor and the stator.

After ambient air is drawn in according to the rotation of the ventilation fan and passes between the rotor and the stator to decrease an increased internal temperature of the inductor motor, the air is outwardly discharged through the outlet formed in the rear bracket of the frame according to the continuous rotation of the ventilation fan, thus allowing for a continuous high output of the induction motor.

The open-type inductor motor is disclosed in Korean Patent Laid Open Publication No. 2001-0036665.

However, in the related art open-type induction motor, since air only flows in an axial direction through a ventilation hole penetrating through the rotor in the axial direction and the space between the rotor and the stator, cooling efficiency of the rotor and the stator is low.

In addition, since the related art open-type induction motor requires the ventilation fan to enable ambient air to be introduced to the rotor and the stator, high manufacturing costs are incurred, and mechanical loss is generated due to driving of the ventilation fan, reducing efficiency of the motor.

SUMMARY

An aspect of the present disclosure may provide an open type induction motor including a rotor and a stator with enhanced cooling efficiency.

According to an aspect of the present disclosure, an open-type induction motor may include: a stator including an iron stator core having a radial duct hole and a stator coil wound around the iron stator core; and a rotor disposed in a hollow of the stator so as to be rotatable by magnetism generated by the stator coil, and including a rotational shaft, a plurality of iron rotor cores stacked in an axial direction of the rotational shaft and coupled to the rotational shaft, a rotor coil coupled to the plurality of iron rotor cores, and duct plates stacked between the plurality of iron rotor cores and outwardly discharging air present at the inner side of the iron rotor cores.

Each of the iron rotor cores may include air holes allowing air to flow therethrough in an axial direction of the rotational shaft, and the duct plate may include a plurality of radially formed blade portions and duct slit portions formed between the plurality of blade portions, communicating with the air holes of the iron rotor cores, and extending and cut outwardly of the iron rotor cores.

The duct slit portions may correspond to the plurality of air holes provided in the iron rotor cores, respectively, and may be radially formed outwardly from an inner side of the duct plates.

The duct plates may include a slit extending portion in which widths of outer ends of the duct slit portion are increased as the ends of the blade portions are tapered.

The iron rotor cores and the duct plate may have a coil coupling hole in which the rotor coil is coupled.

The duct plate may be disposed in a position not aligned with a duct hole of the iron stator core with respect to an axial direction of the rotational shaft.

The induction motor may further include a frame allowing the stator and the rotor to be installed therein and having an air inlet allowing ambient air to be introduced to an interior of the frame therethrough.

The induction motor may further include an air guide provided on both sides within the frame and guiding air introduced through the air inlet of the frame toward the rotor.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
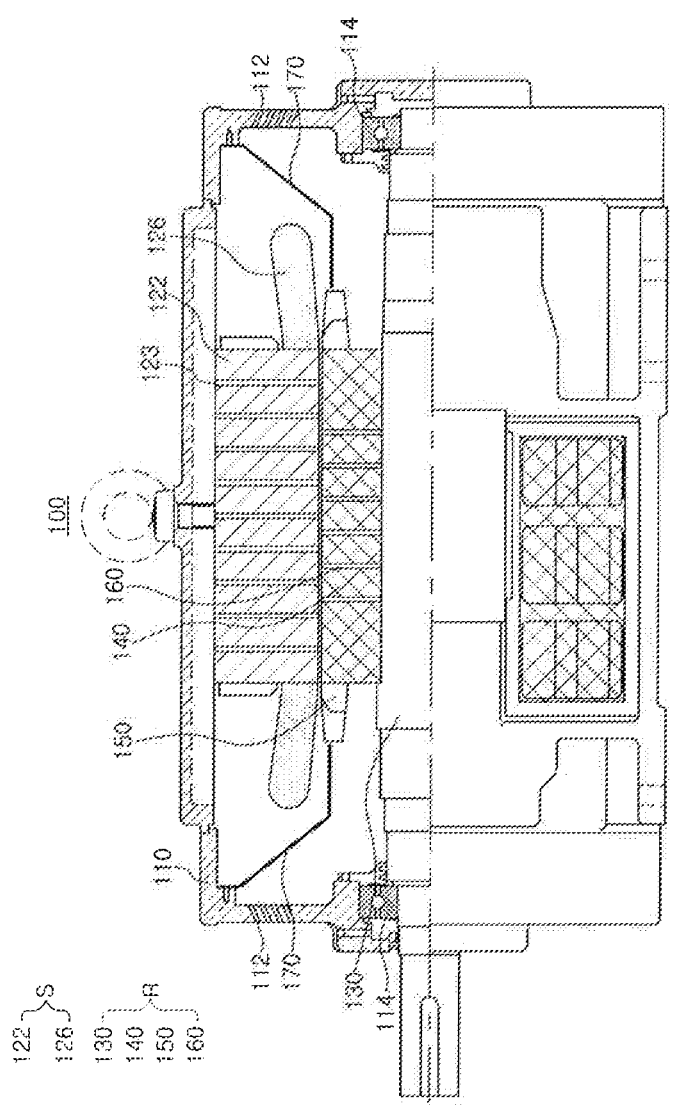
FIG. 1 is a partial cross-sectional view of an open-type induction motor according to an exemplary embodiment of the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

An open-type induction motor according to an exemplary embodiment of the present disclosure will be described with reference to FIGS. 1 through 5.

Figure 2:
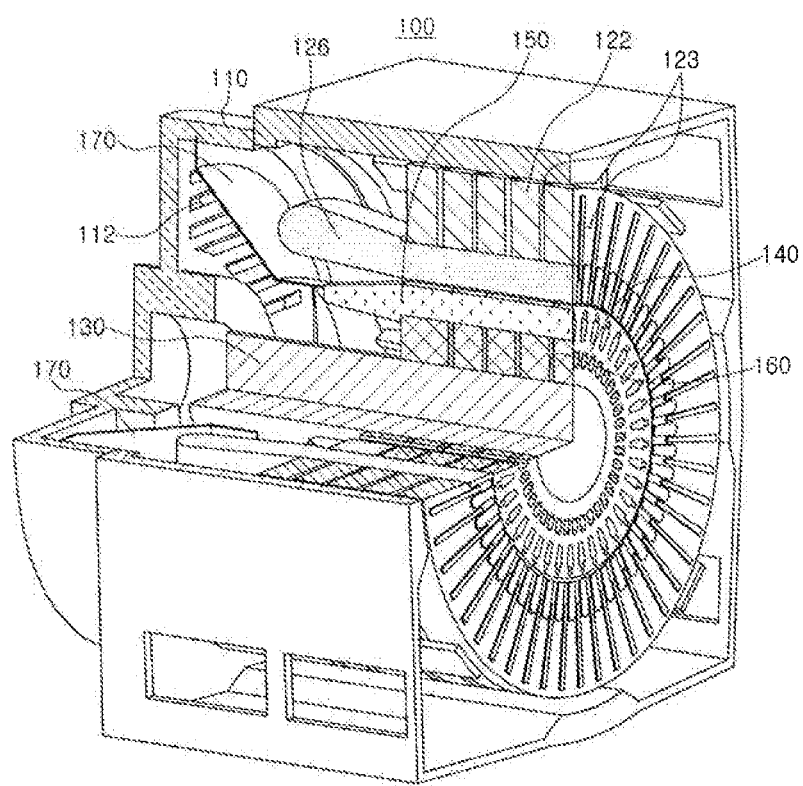
FIG. 2 is a partial cross-sectional perspective view of the open-type induction motor illustrated in FIG. 1.
Figure 3A:
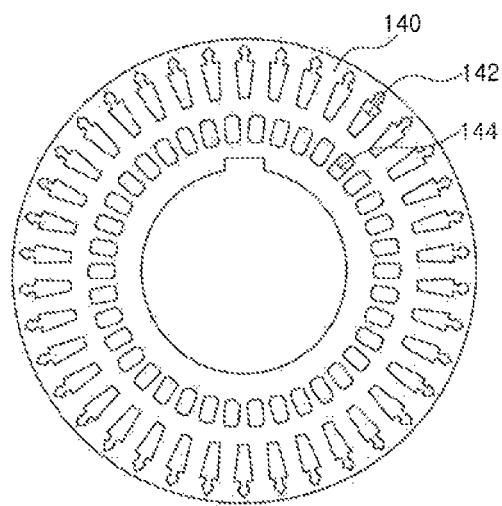
FIGS. 3A and 3B are a plan view of an iron rotor core of a rotor and a plan view of a duct plate included in the open-type induction motor illustrated in FIG. 1.
Figure 3B:
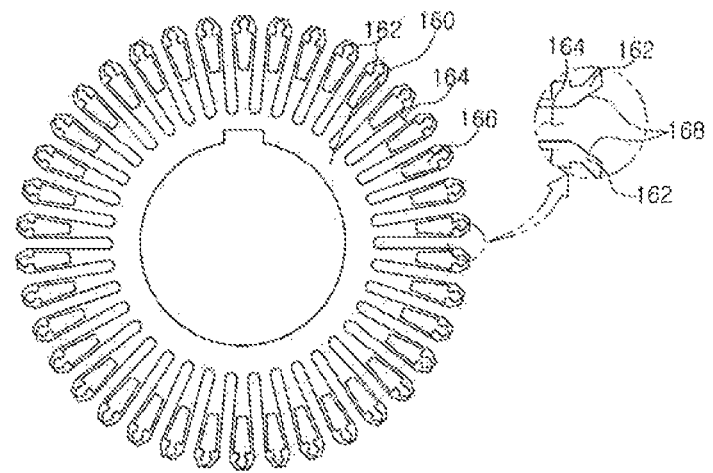
Figure 4:
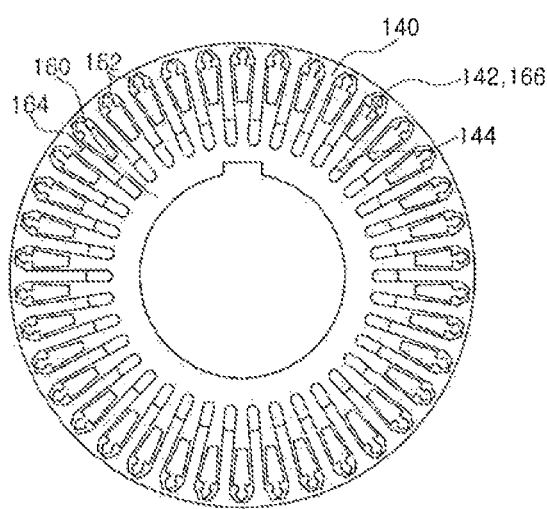
FIG. 4 is a plan view illustrating an overlapping state of the iron rotor core and the duct plate illustrated in FIG. 3.
Figure 5:
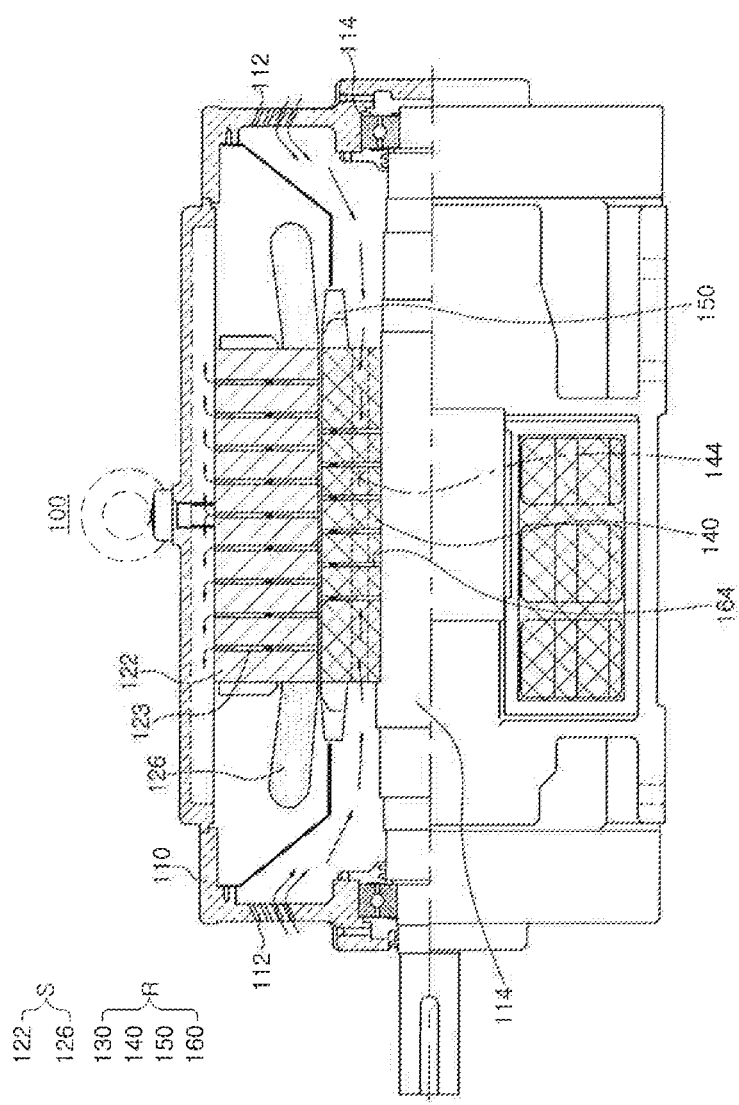
FIG. 5 is a partial cross-sectional view illustrating air flow within the open-type induction motor illustrated in FIG. 1.

FIG. 1 is a partial cross-sectional view of an open-type induction motor according to an exemplary embodiment of the present disclosure, FIG. 2 is a partial cross-sectional perspective view of the open-type induction motor, FIGS. 3A and 3B are a plan view of an iron rotor core and a plan view of a duct plate, FIG. 4 is a plan view illustrating an overlapping state of the iron rotor core and the duct plate, and FIG. 5 is a partial cross-sectional view illustrating air flow within the open-type induction motor.

As illustrated in FIGS. 1 through 5, an open-type induction motor 100 according to an exemplary embodiment of the present disclosure may include a frame 110, a stator S, a rotor R, and an air guide 170.

The frame 110 forms an appearance of the open-type induction motor 100 according to an exemplary embodiment and may have an internal space in which the stator S, the rotor R, and the air guide 170 as described hereinafter are installed.

The frame 110 may have air inlets 112 allowing ambient air to be introduced to an interior of the frame 110. In an exemplary embodiment, the air inlets 112 may be provided in brackets (not shown) coupled to both sides of the frame 110, but the present disclosure is not limited thereto.

In an exemplary embodiment, the air inlets 112 may be provided on both sides of the frame 110 to form a passage through which ambient air is introduced in an axial direction of the stator S and the rotor R as described hereinafter.

The stator S may include an iron stator core 122 fixed within the frame 110 and a stator coil 126 wound around the iron stator core 122.

In an exemplary embodiment, as illustrated in FIG. 2, the iron stator core 122 may have a radial duct hole.

Also, in an exemplary embodiment, a plurality of duct holes may be provided to be spaced apart from one another in the axial direction of the iron stator core 122.

The duct holes may extend outwardly from the iron stator core 122 to form a path for air introduced to an inner side of the iron stator core 122 to pass through the interior of the iron stator core 122 and be subsequently discharged outwardly.

The iron stator core 122 may be cooled by air flowing in the duct holes.

The rotor R is disposed in the hollow of the cylindrical stator S and rotates through magnetism generated by the stator coil 126.

The rotor R may include a rotational shaft 130, an iron rotor core 140, a rotor coil 150, and a duct plate 160.

The rotational shaft 130 is rotatably supported by bearings 114 provided on both sides of the frame 110, and extends such that at least one end thereof is exposed outwardly from the frame 110, to transmit rotary power to an external element.

A plurality of iron rotor cores 140 may be stacked in an axial direction of the rotational shaft 130 and coupled to the rotational shaft 130. Each of the iron rotor cores 140 may have a disk shape, and a plurality of iron rotor cores may be stacked to form a cylindrical iron core.

As illustrated in FIG. 3A, the iron rotor cores 140 may include a plurality of air holes 144 penetrating through the body in a width direction.

The air holes 144 may form a path allowing air to flow in the axial direction of the rotational shaft 130 at an inner side of the plurality of stacked iron rotor cores 140.

Coil coupling holes 142 may be provided on the edge portion of the iron rotor core 140, through which the coil 150 is wound.

In an exemplary embodiment, the iron rotor core 140 may be formed through aluminum die casting having high precision, high strength at high temperatures, and high abrasion resistance, but the present disclosure is not limited thereto.

The rotor coil 150 may be wound around the plurality of iron rotor cores 140 through the coil coupling holes 142 provided in the plurality of iron rotor cores 140.

The rotor coil 150 is wound around the iron rotor core 140, and when a current flows in the rotor coil 150, the rotor coil 150 generates magnetism to magnetize the iron rotor cores 140.

The duct plates 160 may be formed as d-shaped members stacked between the stacked iron rotor cores 140, so a rotation behavior of the duct plates 160 is consistent with that of the iron rotor cores 140.

The duct plates 160 may outwardly discharge air at the inner side of the iron rotor cores 140.

Namely, the duct plates 160 may discharge air flowing in the air holes 144 of the iron rotor cores 140 outwardly of the iron rotor cores 140.

To this end, in an exemplary embodiment, the duct plates 160 may each include a blade portion 162, a duct slit portion 164, and a slit extending portion 168.

As illustrated in FIG. 3B, the blade portion 162 corresponds to a portion radially extending from the center of a body of the duct plate 160.

A coil coupling hole 166 corresponding to the coil coupling hole 142 provided in the iron rotor core 140 may be provided in an end portion of the blade portion 162.

The duct slit portions 164 are formed between the plurality of blade portions 162 and provided as a flow path along which air flows.

Namely, the duct slit portion 164 may correspond to a space between the blade portions 162.

The duct slit portion 164, having a structure extending and cut outwardly of the iron rotor cores 140, may form a path allowing air flowing to the air holes 144 of the iron rotor cores 140 to be discharged outwardly of the iron rotor cores 140.

In an exemplary embodiment, the duct slit portions 164 may correspond to the plurality of air holes 144 provided in the iron rotor cores 140, respectively, and may be radially formed outwardly in the duct plate 160.

As illustrated in FIG. 4, when the iron rotor core 140 and the duct plate 160 overlap, the duct slit portions 164 of the duct plate 160 may communicate with the air holes 144 of the iron rotor core 140.

When the duct slit portions 164 and the air holes 144 communicate, a partial amount of air flowing to the air holes 144 may be discharged outwardly of the iron rotor core 1400 and the duct plate 160 through the duct slit portions 164.

Also, as illustrated in the partially enlarged view of FIG. 3B, the slit extending portion 168 corresponds to a portion in which the end of the blade portion 162 is tapered to increase the width of the outer end portion of the duct slit portion 164.

Namely, the slit extending portion 168 may include sloped surfaces formed on both sides of the ends of the blade portion 162.

The slit extending portion 168 allows air discharged through the duct slit portion 164 to be smoothly discharged in a circumferential direction of the iron rotor core 140 through the sloped surfaces at the ends of the blade portion 162 when the rotor R rotates at a high speed.

Since air resistance of the blade portion 162 that rotates at a high speed is reduced through the slit extending portion 168, efficiency of the motor may be increased and operating noise may be reduced.

In an exemplary embodiment, the duct plate 160 described above may be disposed in a position not aligned with the duct hole 123 of the iron stator core 122 with respect to the axial direction of the rotational shaft 130 as illustrated in FIG. 1.

Accordingly, air discharged through the duct slit portion 164 may be introduced to the space between the iron rotor core 140 and the iron stator core 122 to cool the iron rotor core 140 and the iron stator core 122 and subsequently flow into the duct hole 123, rather than being immediately discharged through the duct hole 123 of the iron stator core 122.

The air guide 170 may be provided on both sides within the frame 110 and guide air introduced through the air inlet 112 of the frame 110 toward the rotor R.

In an exemplary embodiment, the air guide 170 may be configured in the form of a funnel extending from the air inlet 112 toward the rotor R.

Hereinafter, an air cooling operation of the open-type induction motor 100 according to an exemplary embodiment of the present disclosure as described above will be described.

As illustrated in FIG. 5, when the open-type induction motor 100 according to an exemplary embodiment of the present disclosure is driven and the rotor R rotates, air accommodated in the air holes 144 of the iron rotor core 140 moves outwardly of the duct plate 160 through the duct slit portion 164 by centrifugal force according to the rotation of the iron rotor core 140.

In this case, the blade portion 162 of the duct plate 160 may serve as a blade pushing air to exert centrifugal force on the air accommodated in the duct slit portion 164.

The air which has moved through the duct slit portion 164 is discharged outwardly of the duct plate 160 and introduced to the space between the iron rotor core 140 and the iron stator core 122.

The air accommodated in the space between the iron rotor core 140 and the iron stator core 122 is forced in a direction outward from the iron stator core 122 through air pressure generated due to the rotation of the iron rotor core 140 so as to be introduced to the duct hole 123 provided in the iron stator core 122.

The air introduced to the duct hole 123 cools the iron stator core 122 within the iron stator core 122, is discharged outwardly of the iron stator core 122, and subsequently moves to the interior of the frame 110.

Meanwhile, when the air accommodated within the air hole is released due to the rotation of the iron rotor core 140, atmospheric pressure in the air holes 144 is lowered, and thus, ambient air of the frame 1210 is introduced into the air holes 144 through the air inlet 112.

The air guide 170 guides the air introduced through the air inlet 112 toward the rotor R, so that the air may be moved to the air holes 144 of the iron rotor core 140.

In the open-type induction motor 100 according to an exemplary embodiment of the present disclosure, air is introduced to the interior of the iron rotor core 140 and the iron stator core 122 to increase the area in which the rotor R and the stator S are in contact with air, and thus, cooling efficiency of the rotor R and the stator S is enhanced.

Also, in the open-type induction motor 100 according to an exemplary embodiment of the present disclosure, since air is automatically introduced to the interior of the rotor R through rotation of the duct plate 160, an additional fan for introducing ambient air to the rotor is not required, reducing manufacturing costs of the device and preventing the generation of mechanical loss according to driving of the fan.

As set forth above, according to exemplary embodiments of the present disclosure, cooling efficiency of the rotor and the stator may be enhanced by air.

In addition, according to exemplary embodiments of the present disclosure, since an additional fan for introducing ambient air is not required and ambient air is automatically introduced to the rotor and the stator according to rotation of the rotor, the configuration of the device may be simplified, manufacturing costs of the device may be reduced, and mechanical loss is not generated.

While exemplary embodiments have been shown and described above, it will be apparent to those skilled in the art that modifications and variations could be made without departing from the scope of the present invention as defined by the appended claims.

What is claimed is:

1. An open-type induction motor comprising:
   a stator including an iron stator core having a radial duct hole and a stator coil wound around the iron stator core; and
   a rotor disposed in a hollow of the stator so as to be rotatable by magnetism generated by the stator coil, and including a rotational shaft, a plurality of iron rotor cores stacked in an axial direction of the rotational shaft and coupled to the rotational shaft, a rotor coil coupled to the plurality of iron rotor cores, and duct plates stacked between the plurality of iron rotor cores and outwardly discharging air present at the inner side of the iron rotor cores,
   wherein each of the iron rotor cores comprises a plurality of air holes allowing air to flow therethrough in an axial direction of the rotational shaft,
   wherein each of the duct plates includes a plurality of radially formed blade portions and a plurality of duct slit portions formed between the plurality of blade portions,
   wherein the duct slit portions communicate with the air holes of the iron rotor cores, and extend and cut outwardly of the iron rotor cores, and
   wherein the plurality of duct slit portions correspond one-to-one to the plurality of air holes, and are formed radially, outwardly from an inner side of the duct plates.

2. The open-type induction motor of claim 1, wherein the duct plates comprise a slit extending portion in which widths of outer ends of the duct slit portion are increased as the ends of the blade portions are tapered.

3. The open-type induction motor of claim 1, wherein the iron rotor cores and the duct plate have a coil coupling hole in which the rotor coil is coupled.

4. The open-type induction motor of claim 1, wherein the duct plate is disposed in a position deviating from a duct hole of the iron stator core with respect to an axial direction of the rotational shaft.

5. The open-type induction motor of claim 1, further comprising a frame allowing the stator and the rotor to be installed therein and having an air inlet allowing ambient air to be introduced to an interior of the frame therethrough.

6. The open-type induction motor of claim 5, further comprising an air guide provided on both sides within the frame and guiding air introduced through the air inlet of the frame toward the rotor.

* * * * *